United States Patent Office 3,216,250
Patented Nov. 9, 1965

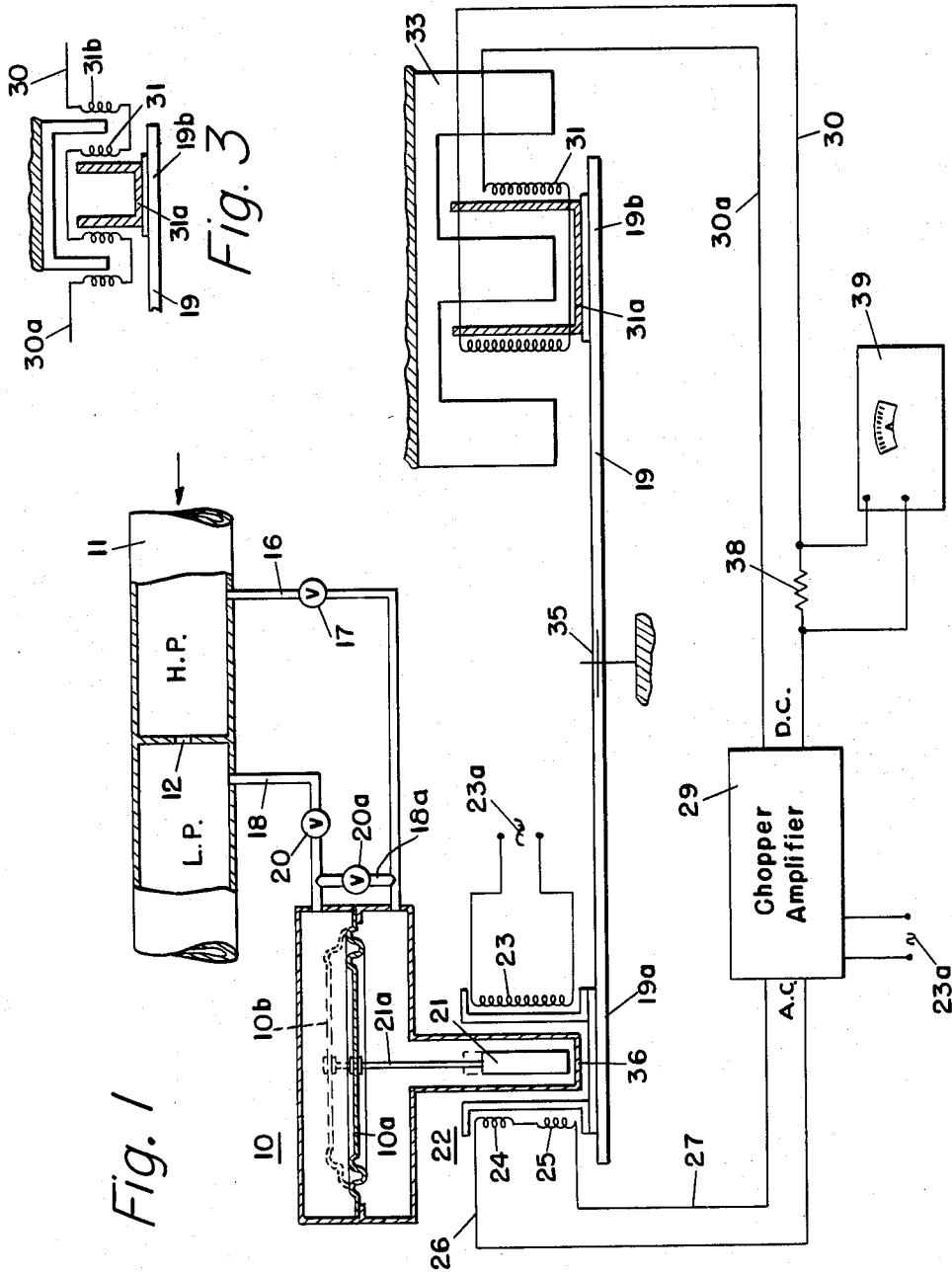

3,216,250
MEASURING SYSTEM
George R. Moreland, Blue Bell, Pa., assignor to Leeds and Northrup Company, Philadelphia, Pa., a corporation of Pennsylvania
Filed May 26, 1961, Ser. No. 120,842
3 Claims. (Cl. 73—205)

This invention relates to measuring systems of the balanceable type and has for an object the provision of a method of and means for transforming the magnitude of a variable condition into a current proportional to the magnitude of such condition.

Heretofore, there have been utilized measuring systems of the balanceable type for the measurement of magnitudes of conditions. Some of them are of the force-balance type, that is to say, a condition responsive element deflects a lever about a fulcrum for relative movement of one element of a balance detector with respect to another element of the detector for production of an error signal which is utilized to develop on the lever a restoring force to return the lever approximately to its initial position. In such systems, the actual movement of the lever is quite small and only represents the amount necessary to develop a required output from an amplifier to restore the lever to its initial position. In another class of measuring systems of the balanceable type, one element of a balance detector is moved by the lever and the other element of the detector is displaced as a function of a condition. The relative movement of the elements of the balance detector again gives rise to an error signal which is amplified, and through a reversible motor, deflects the lever to produce a follow-up movement by the element of the detector mounted on the lever. The follow-up movement reduces the error signal substantially to zero. In such systems, a differential transformer has been utilized as a balance detector where one element of the differential transformer has been moved by a condition responsive element while the other element of the differential transformer has been moved by the lever under the control of the reversible motor. While such systems have been utilized, they have left much to be desired in simplicity of construction, ease of operation, and the obtainment of a high precision of measurement with automatic compensation for the effects of changes in the ambient temperature.

In carrying out the present invention in one form thereof, there is utilized a pivoted lever having associated therewith biasing means tending to maintain the lever in a neutral position. In a preferred embodiment of the invention, the biasing means and temperature compensating means have been combined as by utilizing a pivotal support of the cross-spring type for the lever, the crossed-springs being of a construction and of selected materials to provide a desired temperature compensation, the development of a restoring force on the lever, and the establishing of a pivotal axis for the lever. Further in accordance with the invention, a condition responsive element is arranged to displace an error-signal producing member, a co-operating assembly of which is carried by one end of the lever. Upon production of such error signal, an amplifier having a synchronous rectifier in its output stage produces a direct current output signal which is applied to an electromagnet which acts on the lever to move the co-operating assembly by an amount proportional to the displacement of the first-named member and in the same direction. In this manner, there is developed an output current from the amplifier which is at all times proportional to the magnitude of the condition under measurement. In the preferred form the invention, the condition responsive element is arranged relatively to displace the core and the windings of a differential transformer with the lever providing the above-described follow-up action. By providing a high gain amplifier, the output current is closely proportional to the magnitude of the condition under measurement.

The present invention lacks the criticality of adjustment associated with force-measuring systems particularly in zeroing the same. The present system eliminates entirely the need of a reversible electric motor to develop a restoring action on the lever. Moreover, the balanceable system in accordance with the present invention has automatic compensation for chances in ambient temperature and lends itself to compact design with reliability and precision of measurement.

For a more detailed disclosure of the invention and for further objects and advantages thereof, reference is to be had to the following description taken in conjunction with the accompanying drawings, in which:

FIG. 1 diagrammatically illustrates a position follow-up system embodying the invention;

FIG. 3 is a further modification of the invention.

Figure 1A:
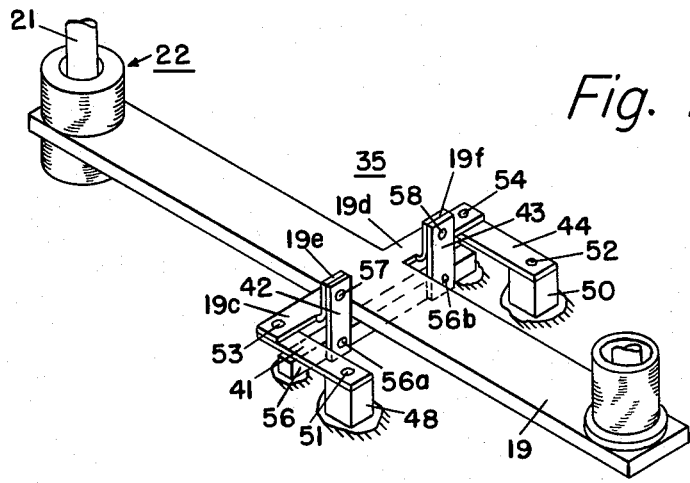
FIG. 1A is a more detailed perspective view of a portion of the system of FIG. 1.

Referring now to FIG. 1 a condition responsive device 10 has been illustrated as a differential pressure gauge connected to a conduit 11 for detecting the pressure differential between the high pressure and low pressure sides of an orifice 12. Fluid flows through the conduit 11 in the direction indicated by the arrow and produces a pressure drop across orifice 12 proportional to the square of the rate of fluid flow. The high pressure side of the orifice 12 is connected to apply pressure to the lower face of the diaphragm 10a of the device 10 by way of a conduit 16 and a valve 17. The low pressure side of the orifice 12 is connected to apply pressure to the upper face of the diaphragm 10a by way of a conduit 18 and valve 20. With an increase in the rate of fluid flow, there is an increase in differential pressure which displaces the diaphragm 10a upwardly by an amount which is proportional to the differential pressure.

The displacement of the diaphragm 10a is transmitted directly by way of a rod 21a to a core 21 of a differential transformer or generating means 22. Thus the core is moved in direct relation to the movement of the diaphragm 10a. The foregoing relation between the differential pressure and the displacement of the diaphragm 10a and the core 21 is illustrated by the straight line curve A in FIG. 2 which shows the percent displacement of the core 21 as a function of the percent variation of the differential pressure. Accordingly, for zero differential pressure, the displacement is zero; for a differential pressure of forty percent the displacement is forty percent of the maximum amount which can take place, and for one hundred percent differential pressure, the displacement is one hundred percent (as shown by the dotted lines 10b for the diaphragm 10a in FIG. 1).

The displacement of the core 21 of the differential transformer 22 may be produced by other well-known condition responsive devices such as Bourdon tubes or bellows.

The differential transformer 22 includes a coil or winding assembly comprising a pair of secondary windings 24 and 25 series wound in electrical opposition and a primary winding 23 energized from a suitable source of current as indicated by the symbol 23a. With the core 21 in a symmetric relation to the windings 23-25, there will be zero output between the conductors 26 and 27 connected to the remote ends of the opposed secondary windings 24 and 25. However, when the core 21 is displaced by the diaphragm 10a, an error voltage appears between conductors 26 and 27. This error voltage is applied to the input circuit of a chopper amplifier 29. The amplifier 29 also has applied thereto the same source of current 23a which energizes the winding 23. The chopper amplifier 29 amplifies and rectifies the error voltage for development of an output current applied to output conductors 30 and 30a of magnitude proportional to the magnitude of the condition under measurement, i.e., the differential pressure which varies with change in the flow of fluid through the pipe 11.

The D.C. output current from the amplifier 29, shown as traversing a resistor 38 forming the input circuit to an indicator device 39, is utilized to develop on the lever 19 a force which causes the lever 19 to move the winding assembly of the differential transformer 22 in the same direction as the above-described movement of the core 21. The movement of the lever 19 against the restoring bias of the crossed-spring support 35 is accomplished by an electromagnet having an E shaped core 33. As shown in the drawings, the current from the amplifier 29 energizes the winding 31 of the electromagnet which winding is mechanically carried by a sleeve 31a itself secured to the end portion 19b of lever 19. The arrangement is similar to that utilized in permanent magnet type speakers. The excursion or extent of displacement of the coil assembly including the sleeve 31a may be relatively large though in practice it will be understood that movements of the lever 19 are confined to relatively small displacements.

It will now be seen that any change in the position of the core 21 will immediately produce a change in current through the coil 31 to produce a follow-up action on the coil or winding assembly 23–25. The winding assembly 23–25 is moved by an amount practically the same as the movement of the core 21, the difference being the small offset needed to produce an error current sufficient to maintain the lever in a stabilized or steady state condition for the foregoing displacements of the core 21. By providing relatively high gain for the amplifier 29 (in the order of several thousand) the required offset, with the diaphragm 10a in its limiting or one hundred percent position 10b, will be relatively small. This is indicated by the separation distance between curves A and B of FIG. 2 for one hundred percent differential pressure where curve B illustrates the percent displacement of the winding assembly 23–25 as a function of the percent variation in the current of coil 31. The maximum offset as there shown will be of the order of 0.1% for a loop gain of 1000. For the same gain and for lesser displacements of the diaphragm 10a the offset will be proportionately less.

It will be remembered that in the above description an increase in the rate of flow in conduit 11 produced a corresponding upward deflection of diaphgram 10a to its dotted line position. If the rate of flow in conduit 11 decreases, the diaphragm 10a moves downwardly from its maximum dotted line position 10b. As the core 21 moves downwardly, the offset error signal applied to the amplifier 29 decreases in magnitude. At the same time, the output current from amplifier 29 likewise decreases in magnitude. Since the restoring force from the crossed-springs pivot 35 varies linearly with deflection of lever 19 from its neutral or zero position, it will be seen that the D.C. output from the amplifier 29 will likewise vary as a linear function and thus will vary as a linear function of the differential pressure applied to the diaphragm 10a. The lever 19 stabilizes in the new position corresponding with the new position of core 21. The change in value of current through the resistor 38 produces a new and precise indication on instrument 39 of the new and lowered differential pressure.

Figure 2:
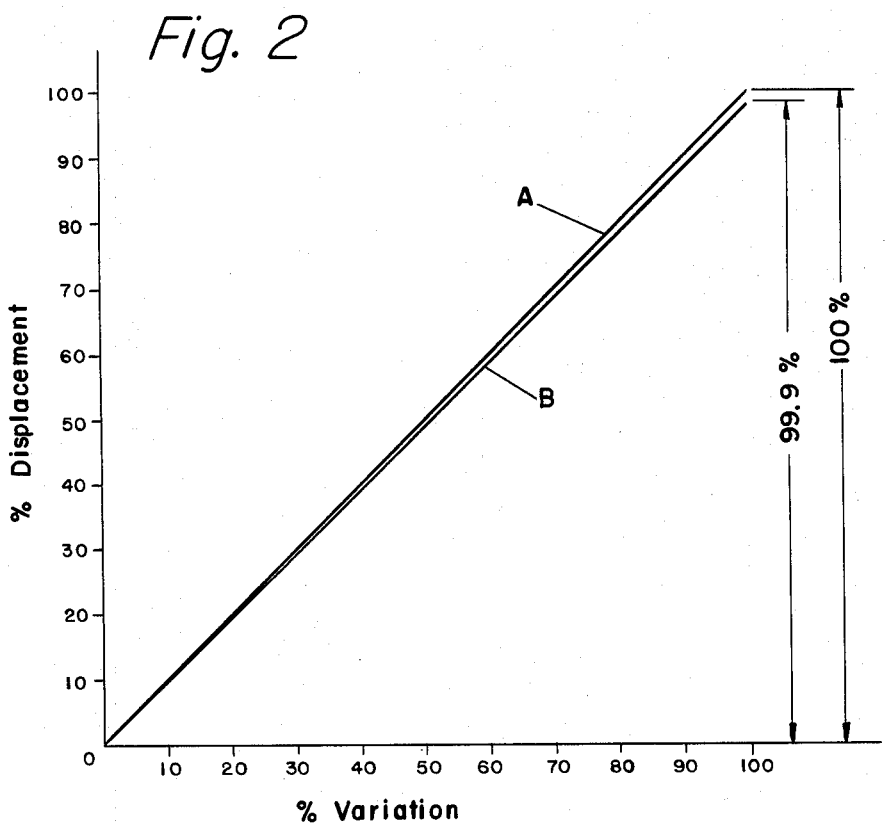
FIG. 2 illustrates on one set of axes two curves explanatory of the system of FIGS. 1 and 2.

Referring now to FIG. 1A, there is shown a more detailed illustration of the structure of the crossed-spring pivot, the way in which the spring members 41–44 support the lever 19, the manner in which they provide the restoring torque and how they provide temperature compensation for the system. The crossed-spring members 41–44 comprise flat thin strips of spring material of equal length and of adequate width and thickness to provide the necessary support for the beam or level 19 and its associated coil assemblies. The crossed-spring members 41–44 have been shown with exaggerated thickness in FIG. 1A since they are preferably quite thin and they are more similar to the crossed-springs 35 diagrammatically shown in FIG. 1. The spring members 41–44 will be operated well within their elastic limits to insure constancy of the restoring force applied to the beam or lever 19 when tilted from its neutral position. The two flat springs 41 and 44 extend horizontally each having its corresponding end secured to a respective one of the stationary supports 48 and 50 as by rivets 51 and 52. The opposite end of each of springs 41 and 44 is secured as by rivets 53 and 54 to extensions 19c and 19d of lever 19. Similarly, two flat springs 42 and 43 extend vertically. The lower ends of springs 42 and 43 are riveted to a stationary member 56 as by rivets 56a and 56b, while their upper ends are secured as by rivets 57 and 58 to upturned ears 19e and 19f of extensions 19c and 19d. The crossed-springs 41, 44 and 42, 43 fix the axis of rotation of the beam or lever 19 in the region of the intersection of the plane of one pair of springs with the plane of the other. All four springs 41–44 participate in developing a restoring force upon rotation of the lever 19 in either direction. The crossed-springs resist lateral movement of lever 19 and also rotational movement in the horizontal plane.

The crossed-springs 41–44 restrict movement of lever 19 about the pivotal axis as above described. Inasmuch as the diaphragm 10a is of spring material and is deflected by the differential pressure, it will be seen that an inaccuracy will be introduced into the measurement if the amount of deflection of the diaphragm 10a changes with temperature, that is, if the modulus of elasticity of the diaphragm material varies with temperature for a given pressure.

In accordance with the present invention, compensation for change in the modulus of elasticity or spring rate of diaphragm 10a with change in temperature is provided by making the springs 41–44 of the same material as the diaphragm 10a and, of course, subject to the same temperature change. Where the diaphragm 10a is made of stainless steel or beryllium copper, then the crossed-springs 41–44 will likewise be made of stainless steel or beryllium copper. Where temperature compensation is also to be introduced to take care of changes in the magnetic flux of the permanent magnet 33 with change in temperature which alters the restoring force developed by the magnet assembly 31, 33, the material of at least one pair of the crossed-springs will be selected to provide a further compensation for the latter purpose.

There will first be considered the effect of a varying temperature on the diaphragm and crossed-springs and neglecting other variables. If the change in the force resisting distortion developed by the diaphragm 10a decreases with rise in temperature, as for example, resulting from a two percent decrease in the modulus of elasticity of the diaphragm for a change in temperature of 100° C., the core 21 will move farther for a given change in differential pressure. However, as the temperature of the diaphragm 10a increases and its spring rate decreases, the restoring force developed by the crossed-springs 41–44 likewise decreases thereby permitting the same current through the speaker coil to move the beam farther by an amount equal to the increased change of the movement of the core 21. Accordingly, for a constant differential pressure the relative positions between the core 21 and the coil assembly 23–25 remain unchanged as they move together with change in temperature.

The effect of change of temperature on the field strength of the permanent magnet 33 will now be considered as for example, when the diaphragm 10a has a modulus of elasticity which decreases two percent for a 100° C. increase in temperature and the magnet 33 has a field strength which decreases one percent for the same 100° C. increase in temperature. For a constant differential pressure, the diaphragm 10a will expand two percent more at the higher temperature thus increasing by two percent the displacement of the core 21. In order to compensate for the effect of temperature change for both the diaphragm 10a and the magnet 33, the restoring force produced by the crossed-springs 41–44 will be required to decrease three percent for the higher temperature. The foregoing will be clearly understood when it is considered that for a decrease in the field strength of the permanent magnet 33, the component of the restoring force (which previously was only utilized to balance out the temperature variation of the diaphragm) must be further decreased in order to maintain without change a current proportional to a constant differential pressure. Accordingly, for a one percent decrease in field strength of the magnet 33, the restoring force is also decreased one percent in order to allow the current without change to hold the lever and the coil assembly 23–25 in an unchanged position relative to the core 21. By providing crossed-springs 41–44 having a modulus of elasticity which varies with temperature equal to the sum of (1) the variation of the diaphragm, plus (2) the decrease in magnetic field strength of the magnet 33 with variation in temperature, there is produced temperature compensation both for the diaphragm and for the field strength.

In a typical example, the above-described three percent variation for a 100° C. increase in temperature may be achieved by using two pairs of crossed-springs where one pair will be constructed of spring steel having a modulus of elasticity of $30 \times 10^6$ and a change in modulus of 2.6% per 100° C. while the other pair will be constructed of Phosphor-bronze having a modulus of elasticity of $15 \times 10^6$ and a change of modulus of 4.0% per 100° C. The two pairs of crossed-springs will have equal lengths and widths and the thicknesses of the cross-springs will conform to the following ratio:

$$\frac{\text{Thickness of Phosphor-bronze crossed-spring}}{\text{Thickness of steel crossed-springs}} = \sqrt[3]{.80} = 0.93$$

As previously described with reference to FIG. 1, the core 21 is displaced in direct relation to the movement of the diaphragm 10a which displacement takes place within a non-magnetic tube 36 connected to the high pressure side of the device 10. Thus, the non-magnetic tube 36 allows the core 21 to be displaced with a high pressure chamber while the windings 23–25 are outside of the chamber and operate at atmospheric pressure.

Mention has already been made that the output current from the amplifier 29 varies as a linear function of the differential pressure applied to the diaphragm 10a and that the instrument 39 provides a precise indication of the differential pressure. It will now be shown that the output current from amplifier 29 may be also vary as a linear function of the rate of the fluid flow through the conduit 11. This new indication may be achieved, as illustrated in FIG. 3, by providing a stationary coil 31b which is substituted for the permanent magnet 33. The coil 31 carried by the sleeve 31a is connected in series circuit relation with the stationary coil 31b. The remote ends of the two coils are connected by way of the conductors 30 and 30a to the output of the amplifier 29.

Upon energization of the series circuit comprising the foregoing two coils 31 and 31b, a force will be produced deflecting the coil 31 and thus displacing the windings 23–25. Since the coils 31 and 31b are in series circuit relation, the windings 23–25 will be displaced by an amount proportional to the square of the current flowing through the coils 31 and 31b. It is well known that the square root of the differential pressure is proportional to the rate of fluid flow and thus it can be seen that the output current of the amplifier 29 will now also be proportional to the rate of fluid flow. This follows since the square of the output current of the amplifier 29 is proportional to the displacement of the windings 23–25 and thus the square of the output current is also proportional to the differential pressure. It therefore follows that the output current is proportional to the square root of the differential pressure. Since the rate of fluid flow is also proportional to the square root of the differential pressure, it is seen that the output current of the amplifier 29 is now proportional to the rate of fluid flow.

In order to provide means for zero adjusting the instrument 39 the conduits 16 and 18 are interconnected by a conduit 18a having an equalizing valve 20a. When the valves 17 and 20 are closed and the equalizing valve 20a opened, the differential pressure on the upper and lower faces of the diaphragm 10a equalizes to zero. With zero differential pressure on the diaphragm 10a, the instrument 39 may then be adjusted to zero.

The principles of the invention having now been explained together with modifications thereof, it is to be understood that many more modifications may be made all within the spirit and scope of the following claims.

What is claimed is:

1. A measuring system comprising a pivoted beam, a spring structure of the crossed-spring type comprising at least one flat strip-like spring member for biasing said beam to a neutral position which bias, upon rotation of said beam from said neutral position, increases in magnitude tending to restore said beam to its neutral position, electrical signal generating means comprising two elements, the first of which elements is movable by said beam, means responsive to the magnitude of a condition for moving the second of said elements relative to said first element for development of an output signal, means for amplifying said output signal, means responsive to said amplified signal for applying a force to said beam proportional to said amplified signal for moving said beam against said bias in a direction to displace said first element to reduce said output signal towards zero, and means responsive to the magnitude of said amplified signal for producing an indication proportional to the magnitude of said condition, said means responsive to the magnitude of a condition including an elastic member having a modulus of elasticity which varies with temperature, and said spring member being constructed of a material having a modulus of elasticity which varies with temperature identical to that of said elastic member to provide temperature compensation therefor.

2. A measuring system comprising a pivoted beam, a spring structure of the crossed-spring type comprising at least one flat strip-like spring member for biasing said beam to a neutral position which bias, upon rotation of said beam from said neutral position, increases in magnitude tending to restore said beam to its neutral position, electrical signal generating means comprising two elements, the first of which elements is movable by said beam, means responsive to the magnitude of a condition for moving the second of said elements relative to said first element for development of an output signal, means for amplifying said output signal, means responsive to said amplified signal for applying a force to said beam proportional to said amplified signal for moving said beam against said bias in a direction to displace said first element to reduce said output signal towards zero, and means responsive to the magnitude of said amplified signal for producing an indication proportional to the magnitude of said condition, said means responsive to the magnitude of a condition including an elastic member having a modulus of elasticity which varies with temperature, said means responsive to said amplifier signal including a permanent magnet having a magnetic field strength which varies with temperature, said spring member being constructed of a material having a modulus of elasticity which varies with temperature equal to the sum of (1) the variation of said elastic member plus (2) the variation in magnetic field strength of said permanent magnet.

3. A measuring system comprising a pivotal beam, means for biasing said beam to a neutral position which bias, upon rotation of said beam from said neutral position, increases in magnitude tending to restore said beam to its neutral position, electrical signal generating means comprising two elements, the first of which elements is movable by said beam, means responsive to the magnitude of a condition for moving the second of said elements relative to said first element for development of an output signal, means for amplifying said output signal, means responsive to said amplified signal for applying a force to said beam proportional to said amplified signal for moving said beam against said bias in a direction to displace said first element to reduce said output signal towards zero, and means responsive to the magnitude of said amplified signal for producing an indication proportional to the magnitude of said condition, said means responsive to the magnitude of a condition including an element having a modulus of elasticity which changes with temperature, said means for biasing said beam including spring structure having a corresponding modulus of elasticity which changes with temperature to compensate for temperature changes in said element.

References Cited by the Examiner
UNITED STATES PATENTS

| | | | |
|---|---|---|---|
| 2,383,757 | 8/45 | Ziebolz | 73—205 |
| 2,568,586 | 9/51 | Hunt | 318—31 X |
| 2,814,312 | 11/57 | Booth | 73—398 X |
| 2,847,625 | 8/58 | Popowsky | 73—398 X |
| 3,061,824 | 10/62 | McLemore | 318—31 X |

RICHARD C. QUEISSER, *Primary Examiner.*
JOSEPH P. STRIZAK, ROBERT L. EVANS,
*Examiners.*